(12) United States Patent
Sakamoto et al.

(10) Patent No.: US 10,246,757 B2
(45) Date of Patent: Apr. 2, 2019

(54) BEARING PART

(71) Applicant: NIPPON STEEL & SUMITOMO METAL CORPORATION, Tokyo (JP)

(72) Inventors: Masashi Sakamoto, Kamaishi (JP); Junichi Kodama, Kamaishi (JP); Yutaka Neishi, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 411 days.

(21) Appl. No.: 15/110,390

(22) PCT Filed: Jan. 9, 2015

(86) PCT No.: PCT/JP2015/050531
§ 371 (c)(1),
(2) Date: Jul. 7, 2016

(87) PCT Pub. No.: WO2015/105187
PCT Pub. Date: Jul. 16, 2015

(65) Prior Publication Data
US 2016/0333438 A1 Nov. 17, 2016

(30) Foreign Application Priority Data

Jan. 10, 2014 (JP) .................................. 2014-003338
Apr. 16, 2014 (JP) .................................. 2014-084952

(51) Int. Cl.
*C21D 9/40* (2006.01)
*C22C 38/00* (2006.01)
*C22C 38/18* (2006.01)
*C22C 38/54* (2006.01)
*F16C 33/62* (2006.01)
*C22C 38/08* (2006.01)
*F16C 33/30* (2006.01)
*F16C 33/64* (2006.01)
*C21D 9/36* (2006.01)
*C21D 9/38* (2006.01)
*C21D 8/06* (2006.01)
*C22C 38/02* (2006.01)
*C22C 38/04* (2006.01)
*C22C 38/06* (2006.01)
*C22C 38/20* (2006.01)
*C22C 38/32* (2006.01)
(Continued)

(52) U.S. Cl.
CPC .............. *C21D 9/40* (2013.01); *B22D 23/00* (2013.01); *C21D 1/18* (2013.01); *C21D 1/32* (2013.01); *C21D 8/065* (2013.01); *C21D 9/36* (2013.01); *C21D 9/38* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/18* (2013.01); *C22C 38/20* (2013.01); *C22C 38/22* (2013.01); *C22C 38/32* (2013.01); *C22C 38/44* (2013.01); *C22C 38/54* (2013.01); *F16C 33/30* (2013.01); *F16C 33/62* (2013.01); *F16C 33/64* (2013.01); *C21D 2211/001* (2013.01); *C21D 2211/003* (2013.01); *C21D 2211/004* (2013.01); *C21D 2211/005* (2013.01); *C21D 2211/008* (2013.01); *F16C 2204/66* (2013.01); *F16C 2204/70* (2013.01); *F16C 2204/72* (2013.01); *F16C 2220/44* (2013.01); *F16C 2223/02* (2013.01); *F16C 2223/10* (2013.01)

(58) Field of Classification Search
CPC ......... C22C 38/02; C22C 38/04; C22C 38/06; C22C 38/18; C21D 9/40
See application file for complete search history.

(56) References Cited

U.S. PATENT DOCUMENTS 5,658,666 A 8/1997 Abe et al.
7,763,124 B2 7/2010 Iwamoto et al.
(Continued)

FOREIGN PATENT DOCUMENTS

CN 1460127 A 12/2003
CN 1774521 A 5/2006
(Continued)

OTHER PUBLICATIONS

Office Action dated Feb. 3, 2017, in Chinese Patent Application No. 201580003908.0, with English translation of Search Report.
(Continued)

*Primary Examiner* — Jessee R Roe
*Assistant Examiner* — Jophy S. Koshy
(74) *Attorney, Agent, or Firm* — Birch, Stewart, Kolasch & Birch, LLP

(57) ABSTRACT

A bearing part according the present invention includes, as the chemical composition, by mass %, C: 0.95% to 1.10%, Si: 0.10% to 0.70%, Mn: 0.20% to 1.20%, Cr: 0.90% to 1.60%, Al: 0.010% to 0.100%, N: 0.003% to 0.030%, P: 0.025% or less, S: 0.025% or less, O: 0.0010% or less, and optionally Mo: 0.25% or less, B: 0.0050% or less, Cu: 1.0% or less, Ni: 3.0% or less, and Ca: 0.0015% or less, and a remainder including Fe and impurities; metallographic structure includes a retained austenite, a spherical cementite and a martensite; an amount of the retained austenite is 15% to 25%, by volume %; an average grain size of prior-austenite is 8.0 μm or less; and a number density of a void having a circle equivalent diameter of 0.02 μm to 3.0 μm is 2000 $mm^{-2}$ or less in the metallographic structure.

4 Claims, 2 Drawing Sheets

(51) Int. Cl.
    C22C 38/44      (2006.01)
    B22D 23/00      (2006.01)
    C21D 1/18       (2006.01)
    C21D 1/32       (2006.01)
    C22C 38/22      (2006.01)

(56) References Cited

U.S. PATENT DOCUMENTS

2007/0277913 A1   12/2007   Kochi et al.
2015/0167112 A1   6/2015    Sakamoto et al.

FOREIGN PATENT DOCUMENTS

| CN | 103320704 A | 9/2013 |
|---|---|---|
| JP | 2001-234286 A | 8/2001 |
| JP | 2001-294972 A | 10/2001 |
| JP | 2003-129176 A | 5/2003 |
| JP | 2004-100016 A | 4/2004 |
| JP | 2004-124215 A | 4/2004 |
| JP | 2006-152407 A | 6/2006 |
| JP | 2007-77432 A | 3/2007 |
| JP | 2007-224410 A | 9/2007 |
| JP | 2009-242920 A | 10/2009 |
| JP | 2012-201984 A | 10/2012 |
| WO | WO 2013/108828 A1 | 7/2013 |

OTHER PUBLICATIONS

International Search Report for PCT/JP2015/050528 dated Apr. 14, 2015.
International Search Report for PCT/JP2015/050531 dated Apr. 14, 2015.
Written Opinion of the International Searching Authority for PCT/JP2015/050531 (PCT/ISA/237) dated Apr. 14, 2015.
Extended European Search Report dated Oct. 23, 2017, in European Patent Application No. 15735602.3.
Korean Notice of Allowance dated Nov. 10, 2017 for corresponding Korean Application No. 10-2016-7019584, with an English translation.
Office Action dated Mar. 20, 2017, in Chinese Patent Application No. 201580003915.0, with partial English translation.
Wang et al., "Analysis on Microstructure and Properties of External and Domestic Bearing Steel," Materials and Heat Treatment (Sep. 25, 2008), vol. 37, No. 18, pp. 48-51, with English Abstract.
Non-Final Office Action dated Jan. 24, 2019, in U.S. Appl. No. 15/110,351.

BEARING PART

TECHNICAL FIELD OF THE INVENTION

The present invention relates to a bearing part such as needle bearings and roller bearings.

Priority is claimed on Japanese Patent Application No. 2014-3338, filed on Jan. 10, 2014, and Japanese Patent Application No. 2014-84952, filed on Apr. 16, 2014, the contents of which are incorporated herein by reference.

RELATED ART

Bearing parts such as needle bearings, roller bearings and ball bearings are continually used under a situation where a foreign material such as burr or abrasion powder is mixed into a lubricating oil, that is, are continually used in a contaminated environment. Therefore, it is important to improve rolling contact fatigue life of a bearing part in a contaminated environment. In order to improve the rolling contact fatigue life of the bearing part in a contaminated environment, it is known that an increase in retained austenite is effective. Accordingly, steel for the bearing parts is subjected to a surface treatment such as carburizing or nitriding.

However, there are some problems that not only a surface treatment such as carburizing or nitriding for the steel for the bearing parts is high cost, but also a variation in qualities occurs under an influence of variations in the treatment atmosphere. Therefore, for example, the Patent Document 1 discloses steel for bearings including large amount of retained austenite manufactured by quenching and tempering with omitting carburizing and nitriding. A bearing part disclosed in the Patent Document 1 secures the amount of retained austenite by lowering martensite start temperature (Ms point) with addition of C, Mn and Ni or Mo into the steel. However, when the additional content of Mn into the steel increases in order to secure the amount of retained austenite, hardenability of steel for bearing parts is raised. As a result, a supercooled structure such as martensite generates during cooling after hot rolling; whereby workability, ductility and toughness of bearing part are deteriorated.

In addition, the Patent Document 2 discloses a method of generating retained austenite with suppressing grain coarsening by using spherical cementite. However, in this method disclosed in the Patent Document 2, spheroidizing annealing at high temperature for long time is performed. As a result, C is solid-soluted into an austenite phase and a number density of spherical cementite is insufficient. Furthermore, the average grain size of prior-austenite is coarsened and an improvement effect of rolling contact fatigue life cannot be obtained sufficiently.

Since a treatment time of spheroidizing annealing is long, when the number of times of the annealing is increased, it is known that production efficiency is deteriorated by increasing a manufacturing cost. To solve this problem, for example, a high-carbon steel rolled wire rod for bearing parts capable of wire drawing without spheroidizing annealing, which was invented by some of the present inventors, is disclosed in the Patent Document 3.

PRIOR ART DOCUMENT

Patent Document

[Patent Document 1] Japanese Unexamined Patent Application, First Publication No. 2004-124215

[Patent Document 2] Japanese Unexamined Patent Application, First Publication No. 2007-077432

[Patent Document 3] PCT International Publication WO 2013/108828

DISCLOSURE OF THE INVENTION

Problems to be Solved by the Invention

However, as in the Patent Document 1, it is found that when the additional content of Mn into the steel is increased, it is difficult to process the steel for bearing parts by omitting a spheroidizing annealing for the foregoing reasons. In addition, it is found that a microstructure control by wire drawing and by quenching, where the quenching temperature is controlled, is needed, in order to manufacture a bearing part having an excellent rolling contact fatigue life in a contaminated environment by using a material disclosed in the patent document 3.

The present invention has been made in view of such circumstances, and the aim of the present invention is to provide a bearing part having an excellent rolling contact fatigue life in a contaminated environment, with limiting the content of Mn in order to secure good wire drawability and without spheroidizing annealing.

Means for Solving the Problem

The present inventors found that the amount of retained austenite can be controlled to 15% to 25% by volume %, when the average grain size of prior-austenite is refined to 8.0 μm or less. Furthermore, the present inventors found that rolling contact fatigue life of a bearing part can be improved even in a contaminated environment, when the number density of voids having a circle equivalent diameter of 0.02 μm to 3.0 μm is 2000 mm$^{-2}$ or less.

The summary of the present invention is as follows.

(1) A bearing part according to one aspect of the present invention includes, as a chemical composition, by mass %: C: 0.95% to 1.10%, Si: 0.10% to 0.70%, Mn: 0.20% to 1.20%, Cr: 0.90% to 1.60%, Al: 0.010% to 0.100%, N: 0.003% to 0.030%, P: 0.025% or less, S: 0.025% or less, O: 0.0010% or less, and optionally Mo: 0.25% or less, B: 0.0050% or less, Cu: 1.0% or less, Ni: 3.0% or less, and Ca: 0.0015% or less, and a remainder including Fe and impurities; a metallographic structure includes a retained austenite, a spherical cementite and a martensite; an amount of the retained austenite is 15% to 25%, by volume %; an average grain size of a prior-austenite is 8.0 μm or less; and a number density of a void having a circle equivalent diameter of 0.02 μm to 3.0 μm is 2000 mm$^{-2}$ or less in the metallographic structure.

(2) The bearing part according to (1) may include, as the chemical composition, by mass %, one or more of Mo: 0.01% to 0.25%, B: 0.0001% to 0.0050%, Cu: 0.1% to 1.0%, Ni: 0.05% to 3.0%, and Ca: 0.0003% to 0.0015%.

(3) In the bearing part according to (1) or (2), a Vickers hardness may be 750 Hv or more, and a rolling contact fatigue life in a contaminated environment may be 5.0×10$^6$ or more, the contaminated environment is an environment where 1 g of an iron powder having a hardness of 750 Hv to 800 Hv and a particle size of 100 μm to 180 μm is mixed into 1 L of a lubricating oil.

Effects of the Invention

According to the above aspects of the present invention, a bearing part having an excellent rolling contact fatigue life can be obtained by controlling an average grain size of prior-austenite, an amount of retained austenite and a number density of voids having a prescribed size, even in a contaminated environment. Therefore, when the bearing parts according to the above aspects are applied for vehicle or industrial machinery, it is possible to achieve a long life of the machine.

EMBODIMENTS OF THE INVENTION

Figure 1:
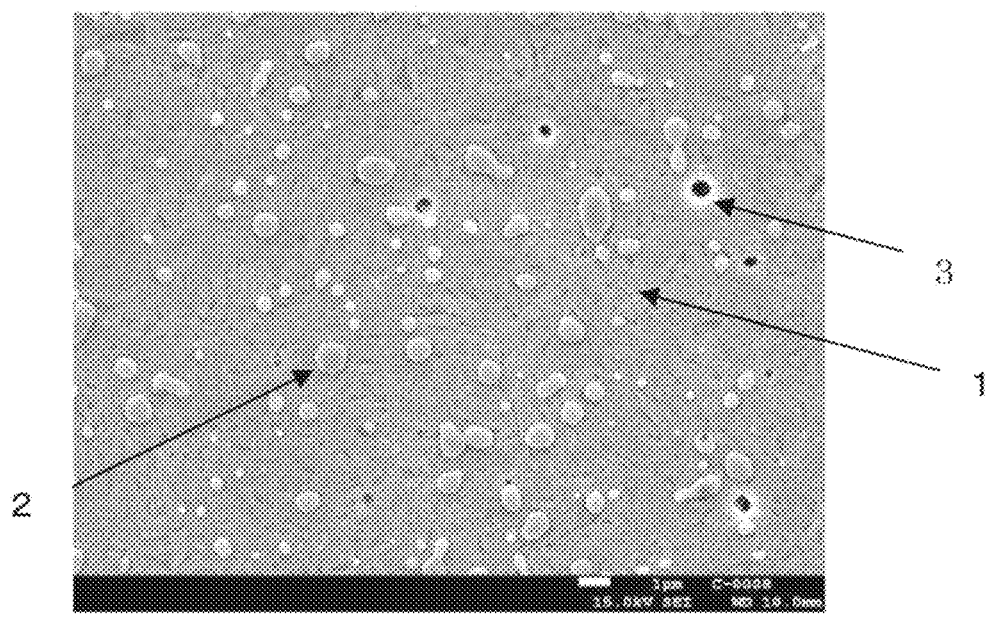
FIG. 1 is a view showing a metallographic structure of a bearing part.

An increase in an amount of retained austenite and a decrease in a number density of voids having a prescribed size are effective for improvement of the rolling contact fatigue life in a contaminated environment. The present inventors have investigated an appropriate amount of the retained austenite and a manufacturing condition for controlling the amount of the retained austenite and obtained the following findings. In addition, the amount of the retained austenite (volume %) can be measured, for example, by the ratio of the diffraction intensity of martensite $\alpha$ (211) to the diffraction intensity of retained austenite $\gamma$ (220) with X-ray diffraction. The amount of the retained austenite can be obtained, for example, with RINT2500, manufactured by Rigaku Corporation.

Along with increasing the amount of the retained austenite, the rolling contact fatigue life can be improved even in contaminated environment. In order to stably obtain this effect, an essential amount of the retained austenite is 15% or more, by volume %. On the other hand, when the amount of the retained austenite is more than 25% by volume %, for example, hardness of a bearing part is lowered such that Vickers hardness is less than 750 Hv and strength of a bearing part is deteriorated. In addition, secular changes (aging deteriorations) of dimension become larger, and it leads to a reduced function as bearing parts. Therefore, in order to improve the rolling contact fatigue life in the contaminated environment, it is necessary to control the amount of the retained austenite being 15% to 25%, by volume %.

It is necessary to stabilize an austenite phase in order to increase the amount of the retained austenite during quenching. In addition, lowering martensite start temperature (Ms point) is effective. The Ms point is affected by solid-soluted amount of the elements such as C, Si and Mn in the austenite phase, particularly, is greatly affected by an amount of solid-soluted C in the austenite phase. However, when a heating temperature during the quenching becomes higher in order to increase the amount of the solid-soluted C, an average grain size of prior-austenite becomes coarsening. Furthermore, the amount of the solid-soluted C in martensite after the quenching increases. Therefore, the rolling contact fatigue life and the toughness of the bearing part are lowered.

Then, the present inventors have focused on a stabilization of an austenite phase due to grain refinement. As a result of the investigation, the present inventors have found that an average grain size of prior-austenite can be refined by wire drawing the steel for bearing parts having pearlite structure (pearlite steel) and by optimizing an introduced plastic strain and the heating temperature during the quenching. Therefore, the present inventors obtained the findings that the average grain size of the prior-austenite of the bearing part, in which the amount of the retained austenite is controlled to 15% to 25% by volume %, is 8.0 µm or less.

In addition, the average grain size of the prior-austenite can be obtained by the following method. Firstly, in a center of a longitudinal direction of a bearing part, a C cross section perpendicular to the longitudinal direction is polished and corroded; thereby a grain boundary of the prior-austenite is appeared. Secondary, a range within a radius of 3 mm from a center of the C cross section is set to a center portion, and photographs are taken at the center portion using an optical microscope with 400 times magnification. Then, the captured images are measured by a counting method defined in JIS G 0551. In addition, four visual fields are measured in each sample, and an average value of grain sizes of the prior-austenite in the obtained four visual fields is set to the average grain size of the prior-austenite.

In order to refine the average grain size of the prior-austenite, controlling total reduction of area during the wire drawing and the heating temperature during the quenching is preferable. When a pearlite steel where proeutectoid cementite is limited to 5% or less by area ratio is subjected to the wire drawing with the total reduction of area of 50% or more, and further the quenching is performed by heating to 820° C. to 890° C. and by cooling, the average grain size of the prior-austenite can be limited to 8.0 µm or less and the amount of the retained austenite can be controlled to 15% to 25% by volume %.

When the total reduction of area during the wire drawing is less than 50%, the average grain size of the prior-austenite may be coarsened by the heating during the quenching and there is a case where the average grain size of the prior-austenite is more than 8.0 µm. In addition, when the heating temperature during the quenching is less than 820° C., there is a case where the amount of the retained austenite is less than 15% by volume % due to lowering of the amount of the solid-soluted C even if the average grain size of the prior-austenite is refined. On the other hand, when the heating temperature during the quenching treatment is more than 890° C., cementite is resolved and solid solution of C is increased. As a result, a suppression of a grain growth becomes insufficient, and then, the average grain size of the prior-austenite becomes more than 8.0 µm. In addition, due to the increase in the amount of the solid-soluted C, there is a case where the amount of the retained austenite becomes more than 25% by volume %.

Figure 2:
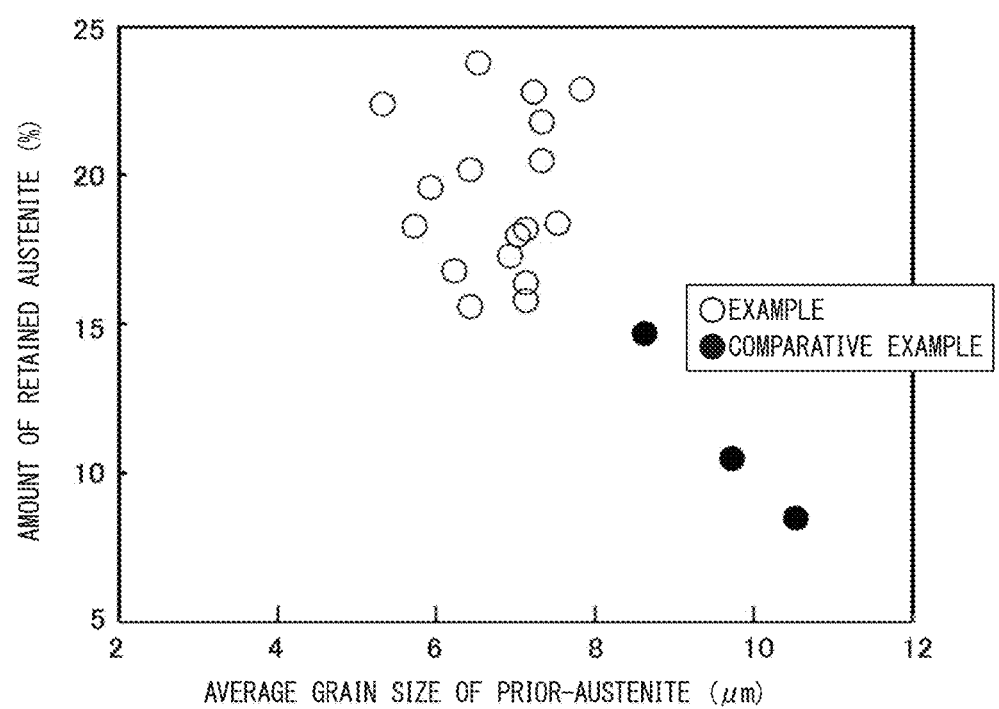
FIG. 2 is a view showing a relationship between an average grain size of prior-austenite and an amount of retained austenite.
Figure 3:
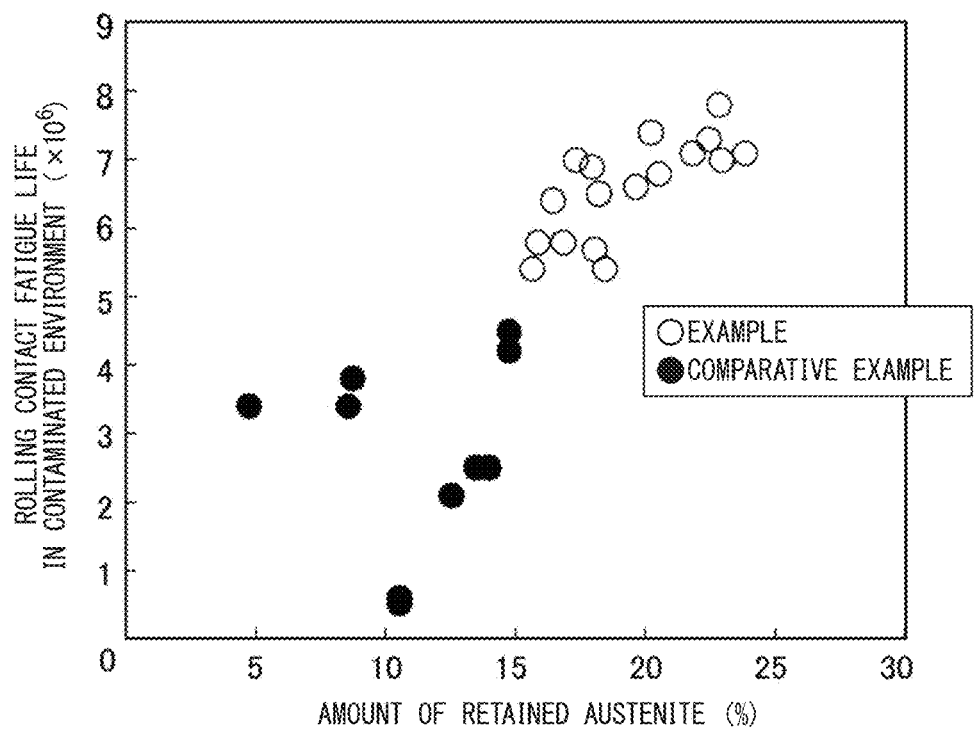
FIG. 3 is a view showing a relationship between an amount of retained austenite and a rolling contact fatigue life in a contaminated environment.

FIG. 2 shows a relationship between the average grain size of the prior-austenite and the amount of the retained austenite, and FIG. 3 shows a relationship between the amount of the retained austenite and the rolling contact fatigue life in the contaminated environment.

As shown in FIG. 2, when the average grain size of the prior-austenite is 8.0 µm or less, the amount of the retained austenite becomes 15% or more by volume %. On the other hand, when the average grain size of the prior-austenite is more than 8.0 µm, the amount of the retained austenite reduces to less than 15% by volume %. In addition, as shown in FIG. 3, when the amount of the retained austenite is 15% or more by volume %, the rolling contact fatigue life in the contaminated environment is good. However, when the amount of the retained austenite is less than 15% by volume %, the rolling contact fatigue life in the contaminated environment deteriorates.

Next, the present inventors have studied a method for reducing a number density of voids. In the metallographic structure of the bearing part according to the present embodiment, the size of the void in the circle equivalent diameter is 0.02 µm to 3.0 µm. When the size of the void in the circle equivalent diameter is less than 0.02 µm, the void cannot be observed using a SEM with 2000 times magnification. In addition, when the size of the void in the circle equivalent diameter is more than 3.0 µm, the void becomes a starting point of cracks during drawing and the bearing part according to the present embodiment cannot be produced. Therefore, the size of the void in the circle equivalent diameter is set to 0.02 µm to 3.0 µm.

Voids usually occur at a boundary between ferrite, which is a matrix structure, and spherical cementite by wire drawing after spheroidizing annealing. Then, the void remains in the bearing part after quenching and tempering. In addition, the void deteriorates the rolling contact fatigue life of the bearing part in the contaminated environment or an impact property of the bearing part. As a result of the investigation by the present inventors, in order to improve the rolling contact fatigue life in the contaminated environment, it is important for setting the number density of the void having the prescribed size to 2000 $mm^{-2}$ or less in the metallographic structure. More preferably, the number density of the void having the prescribed size is 1500 $mm^{-2}$ or less in metallographic structure.

Accordingly, the present inventors have focused on a void generation mechanism, and have intensively studied suppressing the occurrence of the void. As a result, the present inventors found that when a steel after the spheroidizing annealing or a pearlite steel where proeutectoid cementite is more than 5% by area ratio is subjected to the wire drawing, a large amount of a coarse void occurs. On the other hand, the present inventors found that when the pearlite steel for wire drawing is the pearlite steel where the proeutectoid cementite is limited to 5% or less by area ratio, the occurrence of the void can be suppressed during the wire drawing and the number density of the void which occurred in the bearing part can be limited to 2000 $mm^{-2}$ or less.

Therefore, when a material is the pearlite steel where the proeutectoid cementite is limited to 5% or less by area ratio and the quenching is performed after the material is subjected to the wire drawing, the average grain size of the prior-austenite of the bearing part can be limited to 8.0 µm or less.

In addition, the number density of the void having the prescribed size can be obtained by the following method. In a center of a longitudinal direction of a bearing part, the bearing part is cut with a cross section parallel to the longitudinal direction. The cut L cross section is mirror-polished; the observation is performed at the center portion of the L cross section using a scanning electron microscope (SEM) with 2000 times magnification; and photographs are taken at ten visual fields. Then, a number of the void having the prescribed size is measured at each visual field and the number is divided by the visual field area, therefore, the number density of the void can be obtained. In addition, the center portion of the L cross section means 6 mm of a width region from the center line in the longitudinal direction of the L cross-section, and the visual field area is 0.02 $mm^2$.

Figure 4:
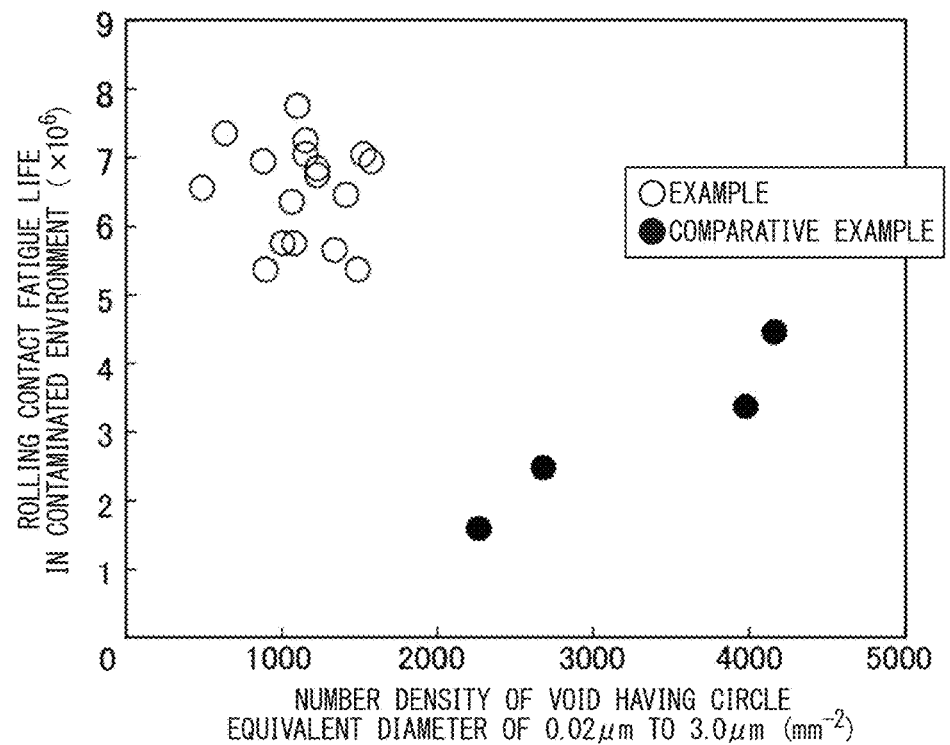
FIG. 4 is a view showing a relationship between a number density of voids having a circle equivalent diameter of 0.02 µm to 3.0 µm and a rolling contact fatigue property in a contaminated environment.

FIG. 4 is a view showing a relationship between the number density of the void having the prescribed size and the rolling contact fatigue life in the contaminated environment. As shown in FIG. 4, when the number density of the voids having the circle equivalent diameter of 0.02 µm to 3.0 µm is 2000 $mm^{-2}$ or less, the rolling contact fatigue life in the contaminated environment is good. However, when the number density of the voids having the circle equivalent diameter of 0.02 µm to 3.0 µm is more than 2000 $mm^{-2}$, the rolling contact fatigue life in the contaminated environment is lowered.

Here, the contaminated environment means, for example, an environment where 1 g of an iron powder having a hardness of 750 Hv to 800 Hv and a particle size of 100 µm to 180 µm is mixed into 1 L of a lubricating oil; and a test of the rolling contact fatigue life in the contaminated environment can be obtained with a radial type fatigue testing machine.

In addition, the rolling contact fatigue life in the above contaminated environment is preferably $5.0 \times 10^6$ times or more. When the rolling contact fatigue life in the contaminated environment is less than $5.0 \times 10^6$ times, there is a case where a machine life cannot be extended.

Next, a metallographic structure of a bearing part according to the present embodiment will be described. The metallographic structure of the bearing part according to the present embodiment is retained austenite, spherical cementite and martensite. FIG. 1 shows a SEM image of the metallographic structure of the bearing part according to the present embodiment. The SEM image of FIG. 1 shows the microstructure where the spherical cementite 2 precipitates in the martensite 1 together with occurrence of the void 3. Because the retained austenite cannot be observed with SEM, the retained austenite can be determined by the ratio of the diffraction intensity of martensite to the diffraction intensity of retained austenite with X-ray diffraction method (XRD).

Hereinafter, regarding the chemical composition of the base elements of the bearing part according to the present embodiment, the numerical limitation range and the reasons for the limitation will be described. Here, "%" in the following description represents "mass %".

C: 0.95% to 1.10%

C (Carbon) is an element for enhancing strength. When a content of C is less than 0.95%, the strength and the rolling contact fatigue life of the bearing part cannot be improved. On the other hand, when the content of C is more than 1.10%, carbide becomes coarse and an amount of retained austenite is excessive. As a result, not only hardness of the bearing part is lowered, but also secular changes (aging deteriorations) of dimension become larger. Therefore, the content of C is set to 0.95% to 1.10%. In order not to lower the rolling contact fatigue life more reliably, the content of C is preferably 0.96% to 1.05%. More preferably, the content of C is 0.97% to 1.03%.

Si: 0.10% to 0.70%

Si (Silicon) is an element for functioning as a deoxidizer. When a content of Si is less than 0.10%, these effects cannot be obtained. On the other hand, when the content of Si is more than 0.70%, $SiO_2$-based inclusion generates in steel, and thus, the rolling contact fatigue life of the bearing part is lowered. Therefore, the content of Si is set to 0.10% to 0.70%. In order not to lower the rolling contact fatigue life more reliably, the content of Si is preferably 0.12% to 0.56%. More preferably, the content of Si is 0.15% to 0.50%.

Mn: 0.20% to 1.20%

Mn (Manganese) is an element for functioning as a deoxidizer and as a desulfurizer. Furthermore, Mn is an element useful for securing the hardenability of the steel and the amount of the retained austenite. When a content of Mn is less than 0.20%, deoxidation is insufficient and oxide is generated. As a result, the rolling contact fatigue life of the bearing part is lowered. On the other hand, when the content of Mn is more than 1.20%, supercooled structure such as martensite is generated during cooling after hot rolling, and thus, it causes occurrence of the void during wire drawing. Furthermore, when the content of Mn is more than 1.20%, the amount of the retained austenite is excessive, and thus, the hardness of the bearing part is lowered. Therefore, the content of Mn is set to 0.20% to 1.20%. In order to promote deoxidization and not to lower the rolling contact fatigue life more reliably, the content of Mn is preferably 0.21% to 1.00%. More preferably, the content of Mn is 0.25% to 0.80%.

Cr: 0.90% to 1.60%

Cr (Chromium) is an element for improving the hardenability of the steel. Furthermore, Cr is an extremely effective element for promoting spheroidizing of carbide and for increasing an amount of the carbide. When a content of Cr is less than 0.90%, the amount of the solid-soluted C is increased, and the excessive retained austenite is generated. On the other hand, when the content of Cr is more than 1.60%, penetration of carbide is insufficient during quenching, and thus, the amount of the retained austenite is lowered or the hardness of the bearing part is lowered. Therefore, the content of Cr is set to 0.90% to 1.60%. In order to improve the rolling contact fatigue life of the bearing part more reliably, the content of Cr is preferably 0.91% to 1.55%. More preferably, the content of Cr is 1.10% to 1.50%. Most preferably, the content of Cr is 1.30% to 1.50%.

Al: 0.010% to 0.100%

Al (Aluminum) is an element for functioning as a deoxidizer. When a content of Al is less than 0.010%, deoxidation becomes insufficient and oxide precipitates. As a result, the rolling contact fatigue life of the bearing part is lowered. On the other hand, when the content of Al is more than 0.100%, AlO-based inclusion generates. As a result, wire drawability of rolled steel for the bearing part is lowered or the rolling contact fatigue life of the bearing part is lowered. Therefore, the content of Al is set to 0.010% to 0.100%. In order not to lower the rolling contact fatigue life more reliably, the content of Al is preferably 0.015% to 0.078%. More preferably, the content of Al is 0.018% to 0.050%.

N: 0.003% to 0.030%

N forms nitride with Al or B and these nitrides function as pinning particles, and thus, grain is refined. Therefore, N (Nitrogen) is an element for suppressing grain coarsening. When a content of N is less than 0.003%, this effect cannot be obtained. On the other hand, when the content of N is more than 0.030%, coarse inclusion generates, and thus, the rolling contact fatigue life is lowered. Therefore, the content of N is set to 0.003% to 0.030%. In order not to lower the rolling contact fatigue life more reliably, the content of N is preferably 0.005% to 0.029%. More preferably, the content of N is 0.009% to 0.020%.

P: 0.025% or less

P (Phosphorus) is an impurity that is unavoidably included in steel. When a content of P is more than 0.025%, P segregates in an austenite grain boundary and embrittles a prior-austenite grain boundary. As a result, the rolling contact fatigue life of the bearing part is lowered. Therefore, it is necessary that the content of P is limited to 0.025% or less. In order not to lower the rolling contact fatigue life more reliably, the content of P may be limited to 0.020% or less, furthermore, limited to 0.015% or less. In addition, since the content of P is desirable as small as possible, and thus, 0% of the content of P is contained into the above limited range. However, controlling the content of P to 0% is not technically easy. Therefore, from the view point of steelmaking cost, the lower limit of the content of P may be set to 0.001%. Considering the normal operating conditions, the content of P is preferably 0.004% to 0.012%.

S: 0.025% or less

S (Sulfur) is an impurity that is unavoidably included in steel. When a content of S is more than 0.025%, coarse MnS forms, and thus, the rolling contact fatigue life of the bearing part is lowered. Therefore, it is necessary that the content of S is limited to 0.025% or less. In order not to lower the rolling contact fatigue life more reliably, the content of S may be limited to 0.020% or less, furthermore, limited to 0.015% or less. Since the content of S is desirable as small as possible, and thus, 0% of the content of S is contained into the above limited range. However, controlling the content of S to 0% is not technically easy. Therefore, from the view point of steelmaking cost, the lower limit of the content of S may be set to 0.001%. Considering the normal operating conditions, the content of S is preferably 0.003% to 0.011%.

O: 0.0010% or less

O (Oxygen) is an impurity that is unavoidably included in steel. When a content of O is more than 0.0010%, oxide inclusion forms, and thus, the rolling contact fatigue life of the bearing part is lowered. Therefore, it is necessary that the content of O is limited to 0.0010% or less. Since the content of O is desirable as small as possible, and thus, 0% of the content of O is contained into the above limited range. However, controlling the content of O to 0% is not technically easy. Therefore, from the view point of steelmaking cost, the lower limit of the content of O may be set to 0.0001%. Considering the normal operating conditions, the content of O is preferably 0.0005% to 0.0010%.

In addition to the base elements and impurity elements mentioned above, the bearing part according to the present embodiment may optionally include at least one or more of Mo, B, Cu, Ni and Ca. In this case, one or more of Mo, B, Cu and Ni for improving the hardenability, and Ca for refining the inclusion can be selected.

Hereinafter, the numerical limitation range of the selective elements and the reasons for the limitation will be described. Here, "%" in the following description represents "mass %".

Mo: 0.25% or less

Mo is an element for improving the hardenability. In addition, Mo has effects for improving grain boundary strength of the steel after quenching is performed and for enhancing toughness of the steel. If it is desirable to secure the hardenability and toughness more reliably, a content of Mo is preferably set to 0.01% or more. However, when the content of Mo is more than 0.25%, these effects are saturated. Therefore, the content of Mo is preferably 0.01% to 0.25%. More preferably, the content of Mo is 0.01% to 0.23%. Even more preferably, the content of Mo is 0.10% to 0.23%.

B: 0.0050% or less

B is an element for improving the hardenability, even if a content of B is small. In addition, B also has effects for suppressing segregation of P or S at the prior-austenite grain boundary during quenching. If it is desirable to obtain these effects, the content of B is preferably set to 0.0001% or more. However, when the content of B is more than 0.0050%, these effects are saturated. Therefore, the content of B is preferably 0.0001% to 0.0050%. More preferably, the content of B is 0.0003% to 0.0050%. Even more preferably, the content of B is 0.0005% to 0.0025%. Most preferably, the content of B is 0.0010% to 0.0025%.

Cu: 1.0% or less

Cu is an element for improving the hardenability. If it is desirable to secure the hardenability more reliably, a content of Cu is preferably set to 0.05% or more. However, when the content of Cu is more than 1.0%, this effect is saturated, furthermore, hot workability is deteriorated. Therefore, the content of Cu is preferably 0.05% to 1.0%. More preferably, the content of Cu is 0.10% to 0.50%. Even more preferably, the content of Cu is 0.19% to 0.31%.

Ni: 3.0% or less

Ni is an element for improving the hardenability. In addition, Ni has effect for improving toughness of the steel after quenching is performed. If it is desirable to secure the hardenability and toughness more reliably, a content of Ni is preferably set to 0.05% or more. However, when the content of Ni is more than 3.0%, this effect is saturated. Therefore, the content of Ni is preferably 0.05% to 3.0%. More preferably, the content of Ni is 0.10% to 1.5%. Even more preferably, the content of Ni is 0.21% to 1.2%. Most preferably, the content of Ni is 0.21% to 1.0%.

Ca: 0.0015% or less

Ca is an element that is solid-soluted into sulfide and forms CaS, and thus, refines the sulfide. If it is desirable to more improve the rolling contact fatigue life by refining the sulfide, a content of Ca is preferably set to 0.0003% or more. However, when the content of Ca is more than 0.0015%, this effect is saturated. Furthermore, since oxide inclusion coarsens, and it causes lowering the rolling contact fatigue life. Therefore, the content of Ca is preferably 0.0003% to 0.0015%. More preferably, the content of Ca is 0.0003% to 0.0011%. Even more preferably, the content of Ca is 0.0005% to 0.0011%.

The bearing part according to the present embodiment includes the above described components, and the remainder of the chemical composition substantially consists of Fe and unavoidable impurities.

Next, steel (hot rolled wire rod) which is a material for a bearing part will be described.

Steel (hot rolled wire rod) which is a material for a bearing part has the same chemical composition as the bearing part. Then, it is preferable that the hot rolled wire rod has microstructure including 90% or more of pearlite by area ratio and 5% or less of proeutectoid cementite by area ratio. In addition, it is preferable that an average grain size of a pearlite block (circle equivalent diameter) is 15 µm or less and a thickness of the proeutectoid cementite is 1.0 µm or less. Furthermore, it is preferable that the microstructure of the steel (hot rolled wire rod), which is the material for the bearing part, does not include martensite.

When the steel (hot rolled wire rod) has supercooled structure such as martensite, it cannot be uniformly deformed during wire drawing. As a result, it may cause wire breakage during wire drawing. Therefore, it is preferable that matrix structure of the steel is pearlite.

In addition, the size of the pearlite block has very strong correlation with ductility. In other words, the wire drawability can be improved by refining the pearlite. Therefore, it is preferable that the average grain size of the pearlite block (circle equivalent diameter) is 15 µm or less. When the average grain size of the pearlite block is more than 15 µm, the effect for improving the wire drawability may not be obtained. On the other hand, it may be industrially difficult to control the average grain size of the pearlite block to 1 µm or less. Therefore, the average grain size of the pearlite block is preferably set to 1 µm to 15 µm. More preferably, the average grain size of the pearlite block is 1 µm to 10 µm.

Here, the average grain size of the pearlite block (circle equivalent diameter) can be measured with an electron backscatter diffraction apparatus (EBSD).

The proeutectoid cementite has little plastic deformability. Therefore, the proeutectoid cementite is divided by wire drawing, and it causes forming the void. However, when an area ratio of the proeutectoid cementite is low and the thickness of the proeutectoid cementite is small, the wire drawability is not inhibited. Accordingly, it is preferable that the proeutectoid cementite is 5% or less by area ratio and the thickness of the proeutectoid cementite is 1.0 µm or less. More preferably, the proeutectoid cementite is 3% or less by area ratio and the thickness of the proeutectoid cementite is 0.8 µm or less.

The area ratio of the proeutectoid cementite and the thickness of the proeutectoid cementite can be measured by observing with SEM.

Next, it will be described the preferred method for manufacturing a bearing part according to the present embodiment.

Steel (hot rolled wire rod) which is a material for a bearing part according to the present embodiment, for example, can be manufactured as follows. Using the following manufacturing method, the steel (hot rolled wire rod) which is the material for the bearing part can be the pearlite steel where the area ratio of the proeutectoid cementite is suppressed to 5% or less.

Materials to which hot rolling is subjected can be manufactured by employing normal manufacturing conditions. For example, steel having the chemical composition adjusted in the usual manner is melted and casted, and then, the steel is subjected to soaking treatment and blooming as needed, to form a billet. Next, the obtained billet is heated and is subjected to hot rolling. Then, after the hot rolled steel is annularly wound, the steel is cooled.

The steel (hot rolled wire rod) which is the material for the bearing part according to the present embodiment can be manufactured through the above processes.

In casting process, the method for casting is not particularly limited, vacuum casting, continuous casting or the like may be used.

In addition, the soaking treatment (soaking diffusion treatment), to which cast piece after the casting process is subjected as needed, is a heat treatment for reducing segregation which the casting or the like causes. The steel piece obtained through these processes is commonly referred to as billet.

Furthermore, a heating temperature during the soaking treatment is preferably 1100° C. to 1200° C. In addition, a holding time of the soaking treatment is preferably 10 hours to 20 hours.

Next, the billet is heated in the heating process before hot rolling. The heating temperature is preferably set to 900° C. to 1300° C.

Then, the above billet is subjected to the hot rolling as the hot rolling process. In the hot rolling process, a finish rolling temperature is preferably set to 850° C. or less.

When the finish rolling temperature is 850° C. or less, the proeutectoid cementite is dispersed and precipitated. As a result, the thickness of the proeutectoid cementite can be reduced. In addition, a nucleation site of the pearlite is increased during a transformation. As a result, the pearlite block can be refined. More preferably, the finish rolling temperature is 800° C. or less. Here, a temperature of the steel during the hot rolling can be measured with radiation thermometer.

Steel, which has passed through the hot rolling process and is a material for a bearing part, that is, steel after the finish rolling is commonly referred to as the hot rolled wire rod.

After the hot rolling process is finished, that is, after the finish rolling, the hot rolled wire rod is annularly wound at a winding temperature of 800° C. or less. This process is commonly referred to as the winding process.

In the winding process, when the winding temperature is high, there is a case where austenite grain grows and the pearlite block coarsens. Therefore, the winding temperature is preferably 800° C. or less. More preferably, the winding temperature is 770° C. or less.

In addition, after the hot rolling process is finished, it may have a cooling process before the winding, in which the cooling is performed as needed.

After the winding process, the hot rolled wire rod is cooled to 600° C. This process is commonly referred to as the cooling process.

A cooling rate to 600° C. is preferably set to 0.5° C./s to 3.0° C./s.

After the rolled wire rod is wound, when the wound wire rod is cooled to 600° C., transformation to the pearlite is completed. There is a case where the cooling rate after winding influences on the transformation to the pearlite from the austenite. Therefore, in order to suppress the precipitation of the supercooled structure such as martensite or bainite, the cooling rate after winding is preferably 3.0° C./s or less. More preferably, the cooling rate after winding is 2.3° C./s or less. On the other hand, there is a case where the cooling rate after winding also influences on the precipitation of the proeutectoid cementite. Therefore, in order to suppress the excessive precipitation of the proeutectoid cementite or coarsening the proeutectoid cementite, the cooling rate after winding is preferably 0.5° C./s or more. More preferably, the cooling rate after winding is 0.8° C./s or more.

Although a conventional method for manufacturing a bearing part has a spheroidizing annealing process before wire drawing, the bearing part according to the present embodiment can be obtained by performing wire drawing, quenching and tempering to the steel, which is a material for the bearing part.

Specifically, the steel, which is a material for the bearing part, is not subjected to the spheroidizing annealing and the steel is subjected to the wire drawing in which the total reduction of area is 50% or more. Then, the steel is subjected to the quenching and the tempering.

When the steel, which is a material for the bearing part, is subjected to the wire drawing in which the total reduction of area is 50% or more, solid solution of cementite and spheroidizing of the cementite are promoted during quenching because of introduced strain. Accordingly, the amount of the retained austenite can be secured and the average grain size of the prior-austenite can be refined.

When the total reduction of area is less than 50%, a prescribed amount of the retained austenite cannot be secured. Furthermore, there is a case where the average grain size of the prior-austenite cannot be refined due to insufficient spheroidizing of the cementite. On the other hand, when the total reduction of area is more than 97%, there is a concern that the wire breakage occurs during the wire drawing. Therefore, the total reduction of area is preferably set to 50% to 97%.

A heating temperature during quenching after wire drawing is preferably set to 820° C. or more in order to resolve cementite for solid solution of C into austenite. When the heating temperature during quenching is less than 820° C., an amount of solid soluted C into the austenite is small, and thus, there is a case where hardness or fatigue life is lowered. On the other hand, when the heating temperature during quenching is more than 890° C., there is a concern that the average grain size of the prior-austenite coarsens. Therefore, the heating temperature during quenching is preferably set to 820° C. to 890° C.

A tempering temperature during the tempering is preferably 150° C. or more in order to secure the toughness and adjust the hardness. When the tempering temperature is less than 150° C., there is a case where the toughness of the bearing part cannot be secured. On the other hand, when the tempering temperature is more than 250° C., the hardness of the bearing product is lowered, and there is a concern that the rolling contact fatigue life is lowered. Therefore, the tempering temperature is preferably set to 150° C. to 250° C.

EXAMPLES

Hereinafter, effects of the bearing part according to the present embodiment will be more specifically described by using examples of the bearing part of the present invention. Here, conditions of Examples are merely examples of conditions employed to check the operability and effects of the present invention, and the present invention is not limited to the following examples of conditions. The present invention is also possible to put into practice after appropriate modifications or variations within the scope adaptable to the gist without departing from the gist of the present invention as long as the object of the present invention can be accomplished. Accordingly, the present invention can employ various conditions, and all of these conditions are contained into the technical features of the present invention.

By subjecting the wire rods or bars having components shown in Table 1 and Table 2 to heat treatment or hot forging, materials having microstructure shown in Table 3 and Table 4 were obtained. Next, the materials were subjected to cold wire drawing until diameters were φ12.5 mm. Then, materials obtained by the wire drawing were cut into lengths of 25 m; the quenching and the tempering were performed.

Next, the obtained materials were machined in form of φ12 mm×22 mm and the finishing was performed, and thus, the bearing parts were manufactured.

In addition, the quenching was performed by oil cooling at 50° C., after it was held for 30 minutes at a heating temperature of 800° C. to 900° C.

Then, the tempering was carried out for 30 minutes at the tempering temperature of 170° C.

Evaluation of the microstructure of the bearing part was carried out in the following manner.

Firstly, an average grain size of prior-austenite (μm), an amount of retained austenite (volume %), and a number density of voids having a prescribed size ($mm^{-2}$) were measured with SEM and X-ray diffraction method.

After the bearing part was cut on the C cross section perpendicular to the longitudinal direction in the center of the longitudinal direction; and the center C cross section was revealed by polishing, a hardness of the bearing part was evaluated by an average value, which was obtained by averaging measured values at the three points in the center portion, which was within a radius of 6 mm from the center of the center C cross section, using a Vickers hardness tester.

In addition, when the Vickers hardness was 750 Hv or more, it was evaluated as good.

The rolling contact fatigue life of the bearing part was measured in the following contaminated environment. The rolling contact fatigue life was measured in the contaminated environment where 1 g of an iron powder having a hardness of 750 Hv to 800 Hv and a particle size of 100 μm to 180 μm was mixed into 1 L of a lubricating oil with a radial type fatigue testing machine.

Then, the measured rolling contact fatigue life was evaluated by the value which was calculated by the cumulative failure probability of 10% with Weibull statistical analysis.

[Table 1]
[Table 2]
[Table 3-1][Table 3-2][Table 3-3]
[Table 4-1][Table 4-2][Table 4-3]

Manufacturing results such as microstructures of the materials, manufacturing methods, microstructures of the bearing parts, and evaluation results such as the hardness, the rolling contact fatigue life are shown in Table 3 and Table 4. In the Tables 1 to 4, the values which are out of the range of the present invention are underlined. In addition, in the Table 3 and Table 4, P represents pearlite, θ represents cementite, M represents martensite, α represents ferrite, and γ represents austenite.

A1 to A11 are examples of the present invention. In addition, examples of the present invention are described as Example in the Tables. In Examples of A1 to A17, chemical compositions were within the proper range of the present invention. Furthermore, in Examples of A1 to A17, since the average grain size of the prior-austenite, the amount of the retained austenite, and the number density of the void having the prescribed size satisfied the conditions of the present invention, the rolling contact fatigue life in the above contaminated environment achieved $5.0 \times 10^6$ times or more. In addition, regarding the microstructures of the materials, the proeutectoid cementite is 5% or less of by area ratio in Examples of A1 to A17. Furthermore, all of the microstructures of the bearing parts were the retained austenite, the spherical cementite and the martensite in Examples of A1 to A17.

On the other hand, A18 to A35, B1 and B2 are Comparative Examples. Since Comparative Examples of A18 to A35, B1 and B2 failed to satisfy one or both of the chemical composition defined by the present invention and microstructures of the bearing parts, the rolling contact fatigue life in the contaminated environment was poor in comparison with the examples of the present invention.

In the Comparative Examples of A18 to A30, chemical compositions were out of the range of the present invention. Since the content of C was small in A18, the amount of the retained austenite was insufficient, and thus, the rolling contact fatigue life in the contaminated environment was poor. Since the content of Mn was small in A22, the amount of the retained austenite was insufficient, and thus, the rolling contact fatigue life in the contaminated environment was poor. Since the content of Cr was excessive in A25, the carbide generated, and thus, the amount of the retained austenite was insufficient. Therefore, the rolling contact fatigue property in the contaminated environment was poor in A25. Since the content of C was excessive in A19, the rolling contact fatigue life was poor due to the generation of the coarse carbides. Since the content of S was excessive in A26, the rolling contact fatigue life was poor due to the generation of the sulfides. Since the content of N was excessive in A30, the rolling contact fatigue life was poor due to the generation of the nitrides. Since the content of Si was excessive in A20, the rolling contact fatigue life was poor due to the generation of the inclusions. Since the content of Al was excessive in A24, the rolling contact fatigue life was poor due to the generation of the inclusions. Since the content of O was excessive in A28, the rolling contact fatigue life was poor due to the generation of the inclusions.

The content of Mn was large in A21, and martensite was generated in the material. Therefore, due to lowering of the wire drawability, the average grain size of the prior-austenite was coarsened and the number density of the void was increased, and thus, the rolling contact fatigue life was poor. In addition, since the content of Mn was large in A21, Ms point was lowered, and the amount of the retained austenite was excessive. As a result, the hardness of A21 was lowered. Since the content of Cr was small in A23, the amount of the retained austenite was excessive, and the hardness of A23 was deteriorated. Since the content of P was excessive in A27, the grain boundary embrittled, and thus, the rolling contact fatigue life was poor. Since the content of N was insufficient in A29, the average grain size of the prior-austenite was increased. As a result, the amount of the retained austenite was insufficient, and the rolling contact fatigue life in the contaminated environment was poor.

Regarding A31 to A35, although the components were within the range of the present invention, the microstructures of the bearing parts were out of the range of the present invention. As a result, the rolling contact fatigue life was poor. Regarding A31 and A32, since total reduction of area during the wire drawing was lowered, the average grain size of the prior-austenite was coarsened. Therefore, the amount of the retained austenite was insufficient, and the rolling contact fatigue life in the contaminated environment was poor. Regarding A33, since the heating temperature during the quenching was lowered, and thus, the amount of the retained austenite was insufficient, and the rolling contact fatigue life was poor. Regarding A34, since the heating temperature during the quenching was high, cementite was excessively solid-soluted. Therefore, the content of the solid-soluted C was increased, and the amount of the retained austenite was excessive, and thus, the hardness was lowered.

Regarding A35, since the cooling rate after winding was higher in the method for manufacturing the material, martensite was generated in the material. Therefore, the number density of the void having the prescribed size was increased, and thus, the rolling contact fatigue life in the contaminated environment was poor. B1 and B2 are the Comparative Examples in which the spheroidizing annealing was performed, the number density of the void having the prescribed size was increased due to the spherical cementite, and thus, the rolling contact fatigue life in the contaminated environment was poor.

INDUSTRIAL APPLICABILITY

According to the above aspects of the present invention, a bearing part can be obtained by suppressing the content of Mn in order to secure good wire drawability and without performing spheroidizing annealing. As a result, since the bearing part having an excellent rolling contact fatigue life even in a contaminated environment can be obtained, the present invention is highly applicable to industries.

BRIEF DESCRIPTION OF THE REFERENCE SYMBOLS

1 Martensite
2 Spherical cementite
3 Void

TABLE 1

| No. | C | Si | Mn | Cr | P | S | Al | N | O | Mo | B | Cu | Ni | Ca | Remarks |
|---|---|---|---|---|---|---|---|---|---|---|---|---|---|---|---|
| A1 | 1.01 | 0.25 | 0.35 | 1.41 | 0.007 | 0.005 | 0.018 | 0.005 | 0.0009 | — | — | — | — | — | Example |
| A2 | 1.05 | 0.15 | 0.30 | 1.40 | 0.008 | 0.004 | 0.020 | 0.012 | 0.0010 | — | — | — | — | 0.0003 | Example |
| A3 | 1.00 | 0.20 | 0.50 | 1.10 | 0.008 | 0.005 | 0.015 | 0.013 | 0.0008 | 0.03 | — | — | 0.21 | — | Example |
| A4 | 0.97 | 0.12 | 0.21 | 0.91 | 0.010 | 0.009 | 0.078 | 0.012 | 0.0005 | 0.05 | 0.0001 | — | 0.50 | — | Example |
| A5 | 1.05 | 0.54 | 1.15 | 1.55 | 0.008 | 0.005 | 0.032 | 0.018 | 0.0007 | 0.01 | — | — | — | — | Example |
| A6 | 0.98 | 0.15 | 0.99 | 1.50 | 0.006 | 0.011 | 0.025 | 0.011 | 0.0006 | — | 0.0002 | — | — | 0.0006 | Example |
| A7 | 1.00 | 0.56 | 0.25 | 1.41 | 0.004 | 0.005 | 0.023 | 0.014 | 0.0006 | 0.23 | — | — | — | — | Example |
| A8 | 1.01 | 0.24 | 0.28 | 1.38 | 0.011 | 0.008 | 0.019 | 0.029 | 0.0008 | — | 0.0021 | 0.31 | — | — | Example |
| A9 | 0.99 | 0.26 | 0.34 | 1.40 | 0.007 | 0.008 | 0.021 | 0.012 | 0.0009 | — | — | 0.19 | — | — | Example |
| A10 | 1.00 | 0.26 | 0.37 | 1.41 | 0.007 | 0.009 | 0.018 | 0.014 | 0.0008 | — | — | — | 1.20 | — | Example |
| A11 | 1.03 | 0.25 | 0.35 | 1.44 | 0.012 | 0.010 | 0.019 | 0.013 | 0.0007 | — | — | — | — | 0.0011 | Example |
| A12 | 0.96 | 0.21 | 0.33 | 1.36 | 0.009 | 0.006 | 0.019 | 0.015 | 0.0008 | — | — | — | — | — | Example |
| A13 | 1.00 | 0.25 | 0.34 | 1.41 | 0.007 | 0.003 | 0.019 | 0.009 | 0.0007 | — | — | — | — | — | Example |
| A14 | 1.00 | 0.25 | 0.34 | 1.41 | 0.007 | 0.003 | 0.019 | 0.009 | 0.0007 | — | — | — | — | — | Example |
| A15 | 1.00 | 0.25 | 0.34 | 1.41 | 0.007 | 0.003 | 0.019 | 0.009 | 0.0007 | — | — | — | — | — | Example |
| A16 | 1.00 | 0.25 | 0.34 | 1.41 | 0.007 | 0.003 | 0.019 | 0.009 | 0.0007 | — | — | — | — | — | Example |
| A17 | 1.00 | 0.25 | 0.34 | 1.41 | 0.007 | 0.003 | 0.019 | 0.009 | 0.0007 | — | — | — | — | — | Example |

TABLE 2

| No. | C | Si | Mn | Cr | P | S | Al | N | O | Mo | B | Cu | Ni | Ca | Remarks |
|---|---|---|---|---|---|---|---|---|---|---|---|---|---|---|---|
| A18 | 0.91 | 0.25 | 0.35 | 1.40 | 0.005 | 0.005 | 0.011 | 0.012 | 0.0006 | — | 0.0020 | — | — | — | Comparative Example |
| A19 | 1.19 | 0.25 | 0.28 | 1.43 | 0.006 | 0.006 | 0.021 | 0.011 | 0.0005 | — | — | — | — | — | Comparative Example |
| A20 | 1.06 | 0.83 | 0.29 | 1.35 | 0.008 | 0.005 | 0.011 | 0.013 | 0.0008 | 0.05 | — | — | — | — | Comparative Example |
| A21 | 0.96 | 0.18 | 1.56 | 1.44 | 0.007 | 0.005 | 0.030 | 0.012 | 0.0006 | — | 0.0002 | — | — | 0.0005 | Comparative Example |
| A22 | 0.99 | 0.25 | 0.06 | 1.45 | 0.007 | 0.005 | 0.029 | 0.014 | 0.0010 | — | 0.0001 | — | — | — | Comparative Example |
| A23 | 1.05 | 0.35 | 0.35 | 0.80 | 0.008 | 0.004 | 0.021 | 0.013 | 0.0008 | — | — | — | — | — | Comparative Example |
| A24 | 1.05 | 0.25 | 0.36 | 1.46 | 0.006 | 0.006 | 0.190 | 0.012 | 0.0005 | — | — | — | — | — | Comparative Example |
| A25 | 1.05 | 0.50 | 0.23 | 1.63 | 0.011 | 0.008 | 0.016 | 0.011 | 0.0005 | — | — | — | — | — | Comparative Example |
| A26 | 1.00 | 0.28 | 0.34 | 1.40 | 0.006 | 0.031 | 0.050 | 0.014 | 0.0007 | 0.21 | — | — | — | — | Comparative Example |
| A27 | 1.00 | 0.27 | 0.35 | 1.41 | 0.029 | 0.007 | 0.051 | 0.014 | 0.0007 | — | — | — | — | — | Comparative Example |
| A28 | 1.02 | 0.25 | 0.35 | 1.39 | 0.008 | 0.010 | 0.008 | 0.011 | 0.0012 | — | 0.0002 | — | — | — | Comparative Example |
| A29 | 1.00 | 0.26 | 0.36 | 1.37 | 0.007 | 0.011 | 0.015 | 0.001 | 0.0007 | — | 0.0020 | — | — | — | Comparative Example |
| A30 | 1.01 | 0.24 | 0.34 | 1.41 | 0.009 | 0.009 | 0.016 | 0.041 | 0.0009 | — | — | — | — | — | Comparative Example |
| A31 | 1.00 | 0.24 | 0.34 | 1.41 | 0.008 | 0.005 | 0.021 | 0.010 | 0.0007 | — | — | — | — | — | Comparative Example |
| A32 | 1.00 | 0.24 | 0.34 | 1.41 | 0.008 | 0.005 | 0.021 | 0.010 | 0.0007 | — | — | — | — | — | Comparative Example |
| A33 | 1.00 | 0.24 | 0.34 | 1.41 | 0.008 | 0.005 | 0.021 | 0.010 | 0.0007 | — | — | — | — | — | Comparative Example |
| A34 | 1.00 | 0.24 | 0.34 | 1.41 | 0.008 | 0.005 | 0.021 | 0.010 | 0.0007 | — | — | — | — | — | Comparative Example |
| A35 | 1.01 | 0.24 | 0.35 | 1.41 | 0.009 | 0.006 | 0.021 | 0.008 | 0.0007 | — | — | — | — | — | Comparative Example |
| B1 | 1.01 | 0.25 | 0.35 | 1.41 | 0.007 | 0.005 | 0.018 | 0.005 | 0.0009 | — | — | — | — | — | Comparative Example |
| B2 | 1.04 | 0.25 | 1.01 | 0.91 | 0.007 | 0.005 | 0.018 | 0.005 | 0.0009 | 0.20 | 0.0020 | — | 1.00 | 0.0015 | Comparative Example |

TABLE 3-1

| | Method for manufacturing bearing part | | | |
|---|---|---|---|---|
| No. | Hot rolled wire rod Microstructure | Total reduction of area during wire drawing (%) | Quenching temperature (° C.) | Tempering temperature (° C.) |
| A1 | P + θ | 75 | 850 | 170 |
| A2 | P + θ | 75 | 850 | 170 |
| A3 | P + θ | 75 | 850 | 170 |
| A4 | P + θ | 75 | 850 | 170 |
| A5 | P + θ | 75 | 850 | 170 |
| A6 | P + θ | 75 | 850 | 170 |
| A7 | P + θ | 75 | 850 | 170 |
| A8 | P + θ | 75 | 850 | 170 |
| A9 | P + θ | 75 | 850 | 170 |
| A10 | P + θ | 75 | 850 | 170 |
| A11 | P + θ | 75 | 850 | 170 |
| A12 | P + θ | 75 | 830 | 170 |
| A13 | P + θ | 61 | 830 | 170 |
| A14 | P + θ | 75 | 830 | 170 |
| A15 | P + θ | 61 | 870 | 170 |
| A16 | P + θ | 75 | 870 | 170 |
| A17 | P + θ | 80 | 870 | 170 |

TABLE 3-2

| | Bearing part | | | |
|---|---|---|---|---|
| No. | Microstructure | Average grain size of prior-austenite (μm) | Amount of retained austenite (%) | Number density of void (mm$^{-2}$) |
| A1 | retained γ + spherical θ + M | 7.1 | 16.4 | 1059 |
| A2 | retained γ + spherical θ + M | 6.9 | 17.3 | 874 |
| A3 | retained γ + spherical θ + M | 7.2 | 22.8 | 1096 |
| A4 | retained γ + spherical θ + M | 5.7 | 18.3 | 1222 |
| A5 | retained γ + spherical θ + M | 6.5 | 23.8 | 1519 |
| A6 | retained γ + spherical θ + M | 7.3 | 20.5 | 1222 |
| A7 | retained γ + spherical θ + M | 7.1 | 18.2 | 1407 |
| A8 | retained γ + spherical θ + M | 5.9 | 19.6 | 481 |
| A9 | retained γ + spherical θ + M | 7.0 | 18.0 | 1333 |
| A10 | retained γ + spherical θ + M | 7.8 | 22.9 | 1567 |
| A11 | retained γ + spherical θ + M | 7.5 | 18.4 | 1481 |
| A12 | retained γ + spherical θ + M | 6.2 | 16.8 | 1074 |
| A13 | retained γ + spherical θ + M | 6.4 | 15.6 | 889 |
| A14 | retained γ + spherical θ + M | 5.3 | 22.4 | 1148 |
| A15 | retained γ + spherical θ + M | 7.1 | 15.8 | 1000 |

TABLE 3-2-continued

| | | Bearing part | | |
|---|---|---|---|---|
| No. | Microstructure | Average grain size of prior-austenite (μm) | Amount of retained austenite (%) | Number density of void (mm$^{-2}$) |
| A16 | retained γ + spherical θ + M | 6.4 | 20.2 | 630 |
| A17 | retained γ + spherical θ + M | 7.3 | 21.8 | 1148 |

TABLE 3-3

| No. | Vickers Hardness | Rolling contact fatigue life (10$^6$ times) | Remarks |
|---|---|---|---|
| A1 | 778 | 6.4 | Example |
| A2 | 784 | 7.0 | Example |
| A3 | 764 | 7.8 | Example |
| A4 | 763 | 6.9 | Example |
| A5 | 762 | 7.1 | Example |
| A6 | 768 | 6.8 | Example |
| A7 | 774 | 6.5 | Example |
| A8 | 786 | 6.6 | Example |

TABLE 3-3-continued

| No. | Vickers Hardness | Rolling contact fatigue life (10$^6$ times) | Remarks |
|---|---|---|---|
| A9 | 779 | 5.7 | Example |
| A10 | 765 | 7.0 | Example |
| A11 | 776 | 5.4 | Example |
| A12 | 775 | 5.8 | Example |
| A13 | 773 | 5.4 | Example |
| A14 | 759 | 7.3 | Example |
| A15 | 794 | 5.8 | Example |
| A16 | 764 | 7.4 | Example |
| A17 | 769 | 7.1 | Example |

TABLE 4-1

| | | Method for manufacturing bearing part | | |
|---|---|---|---|---|
| No. | Hot rolled wire rod Microstructure | Total reduction of area during wire drawing (%) | Quenching temperature (° C.) | Tempering temperature (° C.) |
| A18 | P + θ | 75 | 850 | 170 |
| A19 | P + θ | 75 | 850 | 170 |
| A20 | P + θ | 75 | 850 | 170 |
| A21 | P + θ + M | 44 | 850 | 170 |
| A22 | P + θ | 75 | 850 | 170 |
| A23 | P + θ | 75 | 850 | 170 |
| A24 | P + θ | 75 | 870 | 170 |
| A25 | P + θ | 75 | 870 | 170 |
| A26 | P + θ | 75 | 870 | 170 |
| A27 | P + θ | 75 | 870 | 170 |
| A28 | P + θ | 75 | 870 | 170 |
| A29 | P + θ | 75 | 870 | 170 |
| A30 | P + θ | 75 | 870 | 170 |
| A31 | P + θ | 20 | 850 | 170 |
| A32 | P + θ | 46 | 850 | 170 |
| A33 | P + θ | 75 | 800 | 170 |
| A34 | P + θ | 75 | 900 | 170 |
| A35 | P + θ + M | 61 | 870 | 170 |
| B1 | spherical θ + α | 61 | 870 | 170 |
| B2 | spherical θ + α | 75 | 830 | 170 |

TABLE 4-2

| | | Bearing part | | |
|---|---|---|---|---|
| No. | Microstructure | Average grain size of prior-austenite (μm) | Amount of retained austenite (%) | Number density of void (mm$^{-2}$) |
| A18 | retained γ + spherical θ + M | 6.4 | 13.4 | 1074 |
| A19 | retained γ + spherical θ + M | 6.3 | 23.4 | 1834 |
| A20 | retained γ + spherical θ + M | 7.1 | 18.4 | 1778 |
| A21 | retained γ + spherical θ + M | 8.6 | 26.6 | 4634 |
| A22 | retained γ + spherical θ + M | 6.8 | 12.5 | 1444 |
| A23 | retained γ + spherical θ + M | 6.3 | 25.9 | 1519 |
| A24 | retained γ + spherical θ + M | 7.5 | 15.6 | 1962 |
| A25 | retained γ + spherical θ + M | 7.4 | 10.5 | 1153 |
| A26 | retained γ + spherical θ + M | 5.8 | 18.3 | 2253 |
| A27 | retained γ + spherical θ + M | 6.2 | 17.8 | 1584 |
| A28 | retained γ + spherical θ + M | 8.5 | 13.9 | 2667 |
| A29 | retained γ + spherical θ + M | 8.2 | 14.7 | 1296 |
| A30 | retained γ + spherical θ + M | 5.7 | 19.3 | 1593 |
| A31 | retained γ + spherical θ + M | 10.5 | 8.5 | 1185 |
| A32 | retained γ + spherical θ + M | 8.6 | 14.7 | 1407 |
| A33 | retained γ + spherical θ + M | 4.8 | 8.7 | 1444 |
| A34 | retained γ + spherical θ + M | 10.4 | 26.8 | 1037 |
| A35 | retained γ + spherical θ + M | 9.7 | 10.5 | 4268 |
| B1 | retained γ + spherical θ + M | 10.5 | 4.7 | 3963 |
| B2 | retained γ + spherical θ + M | 7.4 | 18.5 | 4148 |

TABLE 4-3

| No. | Vickers Hardness | Rolling contact fatigue life (10$^6$ times) | Remarks |
|---|---|---|---|
| A18 | 726 | 2.5 | Comparative Example |
| A19 | 798 | 3.5 | Comparative Example |
| A20 | 801 | 1.3 | Comparative Example |
| A21 | 727 | 4.3 | Comparative Example |
| A22 | 785 | 2.1 | Comparative Example |
| A23 | 724 | 6.2 | Comparative Example |
| A24 | 786 | 0.4 | Comparative Example |
| A25 | 739 | 0.5 | Comparative Example |
| A26 | 785 | 1.6 | Comparative Example |
| A27 | 777 | 1.8 | Comparative Example |
| A28 | 768 | 2.5 | Comparative Example |
| A29 | 788 | 4.2 | Comparative Example |
| A30 | 784 | 0.6 | Comparative Example |
| A31 | 756 | 3.4 | Comparative Example |
| A32 | 764 | 4.5 | Comparative Example |

TABLE 4-3-continued

| No. | Vickers Hardness | Rolling contact fatigue life (10⁶ times) | Remarks |
|---|---|---|---|
| A33 | <u>723</u> | <u>3.8</u> | Comparative Example |
| A34 | <u>716</u> | <u>4.4</u> | Comparative Example |
| A35 | 765 | <u>0.6</u> | Comparative Example |
| B1 | 786 | <u>3.4</u> | Comparative Example |
| B2 | 778 | <u>4.5</u> | Comparative Example |

The invention claimed is:

1. A bearing part comprising, as a chemical composition, by mass %,
C: 0.95% to 1.10%,
Si: 0.10% to 0.70%,
Mn: 0.20% to 1.20%,
Cr: 0.90% to 1.60%,
Al: 0.010% to 0.100%,
N: 0.003% to 0.030%,
P: 0.025% or less,
S: 0.025% or less,
O: 0.0010% or less, and
optionally
Mo: 0.25% or less,
B: 0.0050% or less,
Cu: 1.0% or less,
Ni: 3.0% or less, and
Ca: 0.0015% or less, and
a remainder including Fe and impurities,
wherein a metallographic structure includes a retained austenite, a spherical cementite and a martensite,
wherein an amount of the retained austenite is 15% to 25%, by volume %,
wherein an average grain size of a prior-austenite is 8.0 µm or less, and
wherein a number density of a void having a circle equivalent diameter of 0.02 µm to 3.0 µm is 2000 mm$^{-2}$ or less in the metallographic structure.

2. The bearing part according to claim 1 comprising, as the chemical composition, by mass %, one or more of
Mo: 0.01% to 0.25%,
B: 0.0001% to 0.0050%,
Cu: 0.1% to 1.0%,
Ni: 0.05% to 3.0%, and
Ca: 0.0003% to 0.0015%.

3. The bearing part according to claim 1,
wherein a Vickers hardness is 750 Hv or more, and
wherein a rolling contact fatigue life in a contaminated environment is 5.0×10⁶ or more, the contaminated environment being an environment where 1 g of an iron powder having a hardness of 750 Hv to 800 Hv and a particle size of 100 µm to 180 µm is mixed into 1 L of a lubricating oil.

4. The bearing part according to claim 2,
wherein a Vickers hardness is 750 Hv or more, and
wherein a rolling contact fatigue life in a contaminated environment is 5.0×10⁶ or more, the contaminated environment being an environment where 1 g of an iron powder having a hardness of 750 Hv to 800 Hv and a particle size of 100 µm to 180 µm is mixed into 1 L of a lubricating oil.

* * * * *